Patented July 18, 1939

2,166,353

UNITED STATES PATENT OFFICE 2,166,353

ANTHRAQUINONE DYESTUFFS

Robert Norman Heslop and William Wyndham Tatum, Grangemouth, Scotland, assignors to Imperial Chemical Industries Limited, a corporation of Great Britain No Drawing. Application June 21, 1937, Serial No. 149,549. In Great Britain June 23, 1936

5 Claims. (Cl. 260—374)

This invention relates to the manufacture of new anthraquinone dyestuffs.

As is well known, when it is desired to dye wool and other animal fibres in blue and greenish-blue shades, which will be both bright and of very good fastness to light, it is customary to use dyestuffs from what is called the acid alizarine series. With these dyestuffs however, the shades will be only moderately fast to washing and milling, and although chroming will make them quite fast it will be liable to decrease the brightness and perhaps quite alter the shade.

This invention has as an object to produce new dyestuffs which dye wool and other animal fibres in blue and greenish blue shades from a neutral or slightly acid bath and which combine bright shades with fastness to light, milling and washing. A further object is to provide a method of manufacturing such dyes. A further object is to provide a new method of dyeing whereby fast blue and greenish blue shades can be obtained without chroming. A further object is to produce new intermediates for use in the manufacture of such dyes. A still further object is to provide a new method of manufacturing such intermediates. Further objects will appear hereinafter.

These objects are accomplished by the following invention.

We have found that if we interact 1-alkyl amino-4-bromoanthraquinone (see British specification 22,583/1901) with C-alkyl anilines or C-alkyl toluidines (the word "alkyl" in both cases and throughout this specification being limited in its meaning to alkyl radicals having from 3 to 7 carbon atoms) we obtain 1-alkylamino-4-alkylanilino- or -alkyltolylamino- anthraquinones. If we sulphonate these latter compounds we get 1-alkylamino-4-(sulpho-alkylanilino or -tolylamino)-anthraquinones which are dyestuffs having the desiderata mentioned above.

The following examples in which parts are by weight illustrate but do not limit the invention.

Example 1

5 parts of 1-isoamylamino-4-(p-n-butylanilino) anthraquinone, made as described below, are stirred into 25 parts of 100% sulphuric acid at 15–20° C. When the anthraquinone compound has dissolved, 25 parts of chlorosulphonic acid are added and the mixture stirred at the above temperature until a test sample shows that the product is completely soluble in water. The sulphonation mixture is poured into 500 parts of cold water, the precipitated sulphonic acid filtered off, and washed with cold water. The washed substance is suspended in 1000 parts of water containing sodium carbonate, the sparingly soluble sodium salt of the sulphonic acid is filtered off, washed with 150 parts of cold water and freed from any traces of insoluble matter by dissolving in 1500 parts of boiling water, filtering hot, adding 25 parts of sodium chloride at 50° C. to the filtrate, filtering and drying.

The dyestuff dyes wool in bright greenish blue shades and has the formula

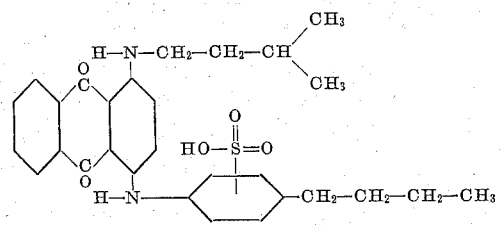

The 1 - isoamylamino - 4 - (p - n - butylanilino) anthraquinone used above has the formula

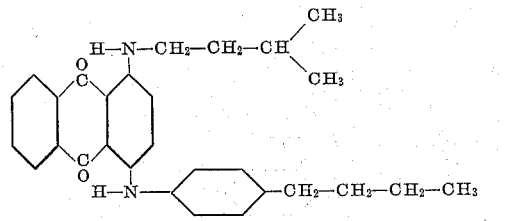

and may be prepared as follows. 1-isoamylaminoanthraquinone, which may be made by the general method of German patent specification No. 144,634, is brominated with bromine in nitrobenzene, and the resulting 4-bromo-1-isoamylaminoanthraquinone, M. P. 96–97° C. is heated with p-n-butylaniline (made from N-butylaniline, see Hickinbottom, J. Chem. Soc., 1930, 1565) at about 110° C. in the presence of anhydrous potassium acetate and copper acetate, when 1-isoamylamino-4-p-n-butylanilinoanthraquinone, M. P. 91–92° C. is obtained.

Example 2

5 parts of 1-isobutylamino-4-(p-n-butylanilino) anthraquinone, M. P. 112–113° C. (obtained in a similar way to 1-isoamylamino-4-(p-n-butylanilino) anthraquinone but from 1-isobutylaminoanthraquinone) are stirred into 45 parts of 100% sulphuric acid at 15–20° C. When the anthraquinone compound has dissolved, 36 parts of 20% oleum are added and the mixture stirred at the above temperature until a test sample shows that the produce is completely soluble in water. The sulphonation mixture is poured into 600 parts of cold water, and the precipitated sulphonic acid converted to the sodium salt and isolated as in Example 1.

The dyestuff dyes wool in bright blue shades.

The 1-isobutylamino-4-(p-n-butylanilino) anthraquinone has the formula

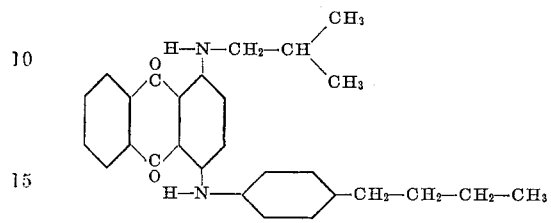

and the dyestuff produced on sulphonation

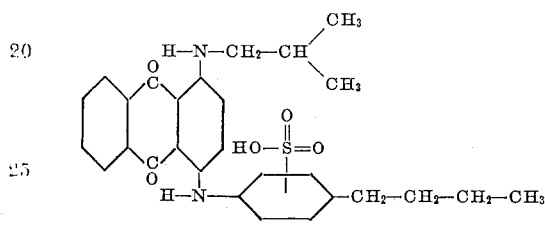

*Example 3*

3.5 parts of 1-isoamylamino-4-(p-n-butyl-o-methylanilino) anthraquinone, M. P. 105–106° C. (obtained by condensing -4-bromo-1-isoamylaminoanthraquinone with 2-methyl-4-n-butylaniline: 2methyl-4-n-butylaniline is made from N-butyl-o-toluidine in a similar way to that used for making p-n-butylaniline from N-butylaniline) are dissolved in 20 parts of 100% sulphuric acid and sulphonated as in Example 2, using 20 parts of 20% oleum.

The dyestuff dyes wood in greenish-blue shades.

The 1-isoamylamino-4-(p-n-butyl-o-methylanilino)-anthraquinone has the formula

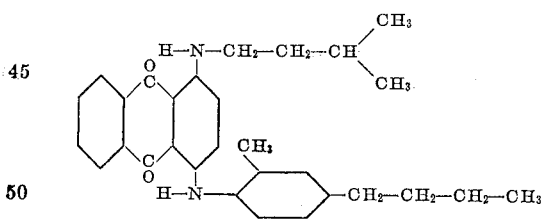

and the dyestuff obtained by sulphonation has the formula

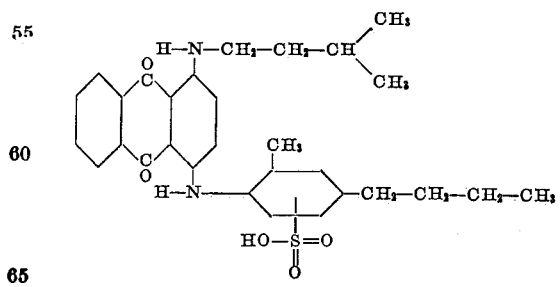

A similar dyestuff may be made by using 4-methyl-2-n-butylaniline (made from N-butyl-p-toluidine as above) instead of 2-methyl-4-n-butylaniline.

*Example 4*

2 parts of 1-isoamylamino-4-(p-n-hexylanilino)-anthraquinone, M. P. 94–95° C. (obtained by condensing 4-bromo -1- isoamylaminoanthraquinone with p-n-hexylaniline) are dissolved in 15 parts of 100% sulphuric acid and sulphonated as in Examples 2 and 3 by the addition of 12 parts of 20% oleum, and isolated.

The dyestuff dyes wool in bright greenish-blue shades.

The 1-isoamylamino-4-(p-n-hexylanilino) anthraquinone has the formula

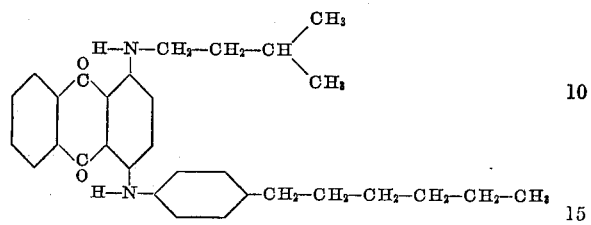

and the dyestuff obtained by sulphonation has the formula

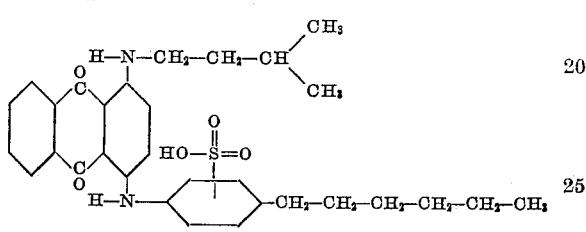

When dyeing with these dyestuffs we prefer to use dyeing assistants, such as cetyl sodium sulphate and Glauber's salt.

Similar dyestuffs could have been obtained if instead of starting with the 1-isoamylaminoanthraquinone of Example 1 we had started with any other 1-alkylaminoanthraquinone in which the alkyl group has from 3 to 7 carbon atoms, e g., 1-isopropylamino-, 1-n-butylamino- or 1-n-hexylamino- anthraquinone. And further instead of using in Example 1, p-n-butylaniline we could have used any C-alkylaniline, e. g., p-isoamylaniline, p-n-hexylaniline or p-n-heptylaniline or any C-alkyltoluidine, e. g., p-butyl-o-toluidine in which the alkyl group has from 3 to 7 carbon atoms.

This invention is a great advance in the art as it enables us to dye wool in very bright blue and greenish blue shades which are fast to light, milling, and severe washing (tests for which are described in British specification No. 430,160), without resorting to chroming which with hitherto known dyes has decreased the brightness and altered the shade of the dye.

As many apparently widely different embodiments of this invention may be made without departing from the spirit and scope thereof, it is to be understood that we do not limit ourselves to the specific embodiments thereof except as defined in the appended claims.

We claim:

1. A compound of the class consisting of 1-alkylamino-4-arylaminoanthraquinone and its sulfonation products, in which the alkyl groups carry from 3 to 7 carbon atoms and in which the arylamino group carries an alkyl group containing from 3 to 7 carbon atoms.

2. As new substances, compounds having the formula

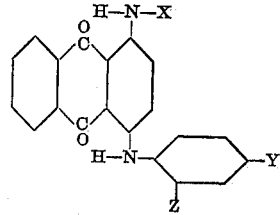

where X and Y are alkyl groups having from 3 to 7 carbon atoms and Z stands for a member of the class consisting of $CH_3$ and H.

3. As new substances, compounds having the formula

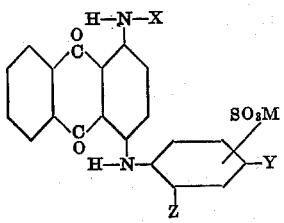

where X and Y are alkyl groups having from 3 to 7 carbon atoms, Z stands for a member of the class consisting of $CH_3$ and H, and M stands for an element of the class consisting of hydrogen and alkali metals.

4. The process for the manufacture of 1-alkylamino-4-alkylarylaminoanthraquinones in which the alkyl radicals contain from 3 to 7 carbon atoms, which comprises reacting a 1-alkylamino-4-bromoanthraquinone with a compound of the class consisting of C-alkylarylamines in which the alkyl groups which are attached directly to the aryl ring contain from 3 to 7 carbon atoms.

5. The process for the manufacture of 1-alkylamino-4-alkylarylaminoanthraquinone sulfonic acids in which the alkyl radicals contain from 3 to 7 carbon atoms, which comprises reacting a 1-alkylamino-4-bromoanthraquinone with a compound of the class consisting of C-alkylarylamines in which the alkyl groups which are attached directly to the aryl ring contain from 3 to 7 carbon atoms, and sulfonating the resulting compound.

ROBERT NORMAN HESLOP.
WILLIAM WYNDHAM TATUM.